US006742303B2

(12) United States Patent
Pedemonte

(10) Patent No.: US 6,742,303 B2
(45) Date of Patent: Jun. 1, 2004

(54) LINEAR ACTUATOR FOR GATES, DOORS AND THE LIKE

(75) Inventor: Carlo Pedemonte, Alessandria (IT)

(73) Assignee: Genius s.r.l. (IT)

( * ) Notice: Subject to any disclaimer, the term of this patent is extended or adjusted under 35 U.S.C. 154(b) by 42 days.

(21) Appl. No.: 10/149,102

(22) PCT Filed: Dec. 7, 2000

(86) PCT No.: PCT/EP00/12407

§ 371 (c)(1),
(2), (4) Date: May 26, 2002

(87) PCT Pub. No.: WO01/42607

PCT Pub. Date: Jun. 14, 2001

(65) Prior Publication Data

US 2003/0010142 A1 Jan. 16, 2003

(30) Foreign Application Priority Data

Dec. 9, 1999 (IT) ........................................ AL99A0010

(51) Int. Cl.[7] .......................... E05F 11/24; E05F 11/08; F16H 27/02

(52) U.S. Cl. .......................... 49/339; 49/344; 74/89.15

(58) Field of Search .......................... 49/339, 340, 343, 49/344, 358, 226; 74/89.35, 89.15

(56) References Cited

U.S. PATENT DOCUMENTS

| | | | | | |
|---|---|---|---|---|---|
| 4,367,610 | A | * | 1/1983 | Goode | 49/336 |
| 4,735,018 | A | * | 4/1988 | Duncan et al. | 49/340 |
| 4,934,203 | A | * | 6/1990 | Bailey et al. | 49/340 |
| 5,507,120 | A | * | 4/1996 | Current | 49/340 |
| 6,138,412 | A | * | 10/2000 | Rieckmann et al. | 49/349 |

FOREIGN PATENT DOCUMENTS

| | | | | |
|---|---|---|---|---|
| WO | WO 90/01097 | * | 2/1990 | 49/339 X |

* cited by examiner

*Primary Examiner*—Hugh B. Thompson, II
(74) *Attorney, Agent, or Firm*—Shlesinger, Fitzsimmons & Shlesinger

(57) ABSTRACT

A linear actuator for gates, doors or similar has an actuator arm (1) which is articulated to a support (3) around a vertical axis (15) and be raisable angularly around a horizontal inclination axis (16). The actuator arm (1) has a screw (7) which is operated by an electric motor (11) and a running nutscrew (8) articulated to the gate wing (5) by a leadnut holder (18) in which the nutscrew (8) is housed in a manner turning around an axis horizontal and transversal to the actuator arm (1). The leadnut holder (18) has a vertical lower articulation pivot (20) which engages from above in a turning manner in a bush (22) fastened to the wing (5). In an emergency the actuator is disengaged from the gate wing (5) by raising the actuator arm (1) angularly around its inclination axis (16) and extracting upward the articulation pivot (20) of the leadnut holder (18) from the bush (22).

14 Claims, 4 Drawing Sheets

LINEAR ACTUATOR FOR GATES, DOORS AND THE LIKE

Figure 1:
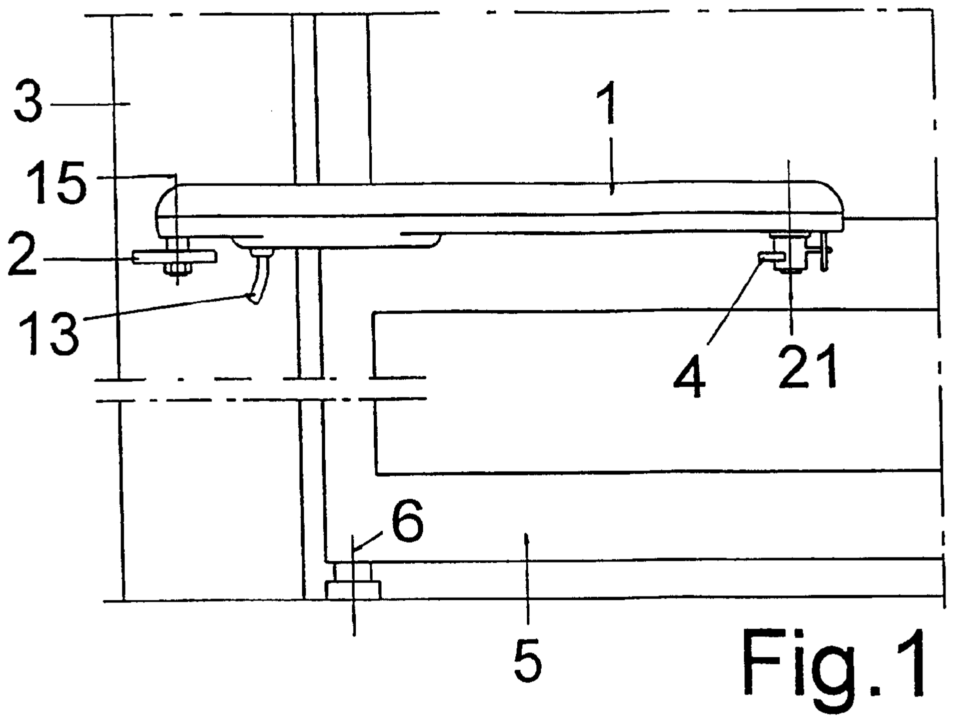

This application is a continuation of PCT/EP00/12407, filed Dec. 7, 2000.

The subject matter of the present invention is a linear actuator for gates, doors and other similar passage barriers with at least one closing wing or the like swinging around a generally virtually vertical oscillation axis and comprising an articulated actuator arm with its rear end articulated to a fixed support in a manner swinging around a traversing axis virtually parallel to the oscillation axis of the wing and near it with there being assembled in the actuator arm an irreversible handling pair consisting of a screw and a respective nut and a nutscrew of which the screw extends in the longitudinal direction of the actuator arm and is operated at its rear end by an electric motor and by a reduction gear assembled in the actuator arm while the nutscrew slides along the actuator arm and is articulated to the wing or to a part fastened to the wing in a manner rotating around an articulation axis virtually parallel to the oscillation axis of the wing. DE-A-19640227 discloses a linear actuator wherein the gate wing can be manually moved in case of the motor not working, thanks to a locking means which can be released in order to allow the actuator arm to rotate independently from the gate wing. However, the actuator arm and the gate wing remain connected to each other.

The general purpose of the present invention is to improve the above mentioned type of linear actuator so as to obtain in combination with a simple, economical and reliable construction embodiment the possibility of easy assembly and safe operation of the actuator within broad geometrical tolerances for example even in the case of imperfect parallelism between the oscillation axis of the wing and/or the traversing axis of the actuator arm and/or the articulation axis of the nutscrew to the wing together with the possibility of disengaging the actuator arm in an emergency for example power failure with easy and fast operation of the respective wing so as to be able to move the wing manually and in particular even in its closed position.

The purpose is achieved by the present invention having the following characteristics.

(a) The actuator arm is articulated to the fixed support by means of a joint allowing in addition to oscillation of the actuator arm around the traversing axis a vertical angular shifting of said arm upward around an inclination axis virtually horizontal and transversal to the actuator, and (b) the nutscrew is articulated to the wing by means of a joint allowing disengagement of the nutscrew from the wing by means of a vertical angular shift upward of the actuator arm around its inclination axis.

Preferably in accordance with a preferred embodiment the linear actuator in accordance with the present invention also has the following characteristics.

(c) There are provided movable stop means operated and/or born by the nutscrew or by the shiftable parts together therewith and in particular by parts integral with the wing and said movable stop means automatically engage in the forward end position of the nutscrew corresponding to the closed position of the wing with associated stop means born by the actuator arm so as to prevent angular upward shifting of the actuator arm around its inclination axis, and (d) the forward end of the screw opposite the operating motor is accessible at the respective free end of the actuator arm and can be coupled with manual rotation means with the aid of which it can be rotated in an emergency in such a manner as to shift the nutscrew from its closed front end position of the wing backward towards its rear end and by an amount such as to disengage the movable stop means from the stop means born by the actuator arm and thus allow angular shifting upward of the actuator arm around its inclination axis so as to disengage the nutscrew and hence the actuator arm from the wing and allow manual shifting thereof.

Both the joint between the actuator arm and its support and the joint between the nutscrew and the wing can be made in any manner suited to the purpose. In accordance with a preferred embodiment the joint between the actuator arm and its support consists of a ball joint or a universal joint with two axes, viz made up of two cylindrical articulations at a right angle to each other with one having an axis virtually horizontal and transversal to the actuator arm (actuator arm inclination axis) and the other with virtually vertical axis (actuator arm traversing axis).

The joint between the nutscrew and the wing in accordance with a preferred embodiment can be a two-axis universal joint, viz a joint made up of two cylindrical articulations with axes at right angles to each other with one having an axis virtually horizontal and transversal to the actuator arm (directional axis) between the nutscrew and a leadnut holder member and the other with virtually vertical axis (articulation axis) provided between the leadnut holder and the wing provided in a manner disengageable from the wing by upward shifting of the actuator arm around its inclination axis. In particular said two-axis universal joint consists of a leadnut holder member provided below with a cylindrical articulation pivot with axis virtually parallel to the wing oscillation pivot, viz generally virtually vertical with said articulation pivot engaging in a manner turning around its axis in a corresponding articulation bush integral with the wing and withdrawable upward from said bush or vice versa while the nutscrew is assembled in the leadnut holder so as to turn around a directional axis virtually horizontal to and transversal to the actuator arm, viz virtually parallel to the actuator arm inclination axis.

The stop means between the actuator arm and the nutscrew and/or the wing at the end of travel of the latter for closing the wing can be made in various ways. In accordance with a very simple and economical embodiment the stop means consist of at least one movable stop projection which is integral with the nutscrew or the leadnut holder or the wing and which automatically engages at the end of the nutscrew closing travel in a corresponding stop recess provided in the actuator arm or vice versa.

The manual emergency screw operation means can also be made in any manner suited to the purpose in order to move the nutscrew backwards and consequently release the actuator arm to allow moving it angularly upward. In accordance with a preferred embodiment said manual emergency operating means consist of an axial head hole provided in the accessible front end of the screw and having a not round profile and corresponding if necessary to a given coding and a release key having a tang with cross section correspondingly profiled and engageable in said screw head hole or vice versa.

Figure 2:
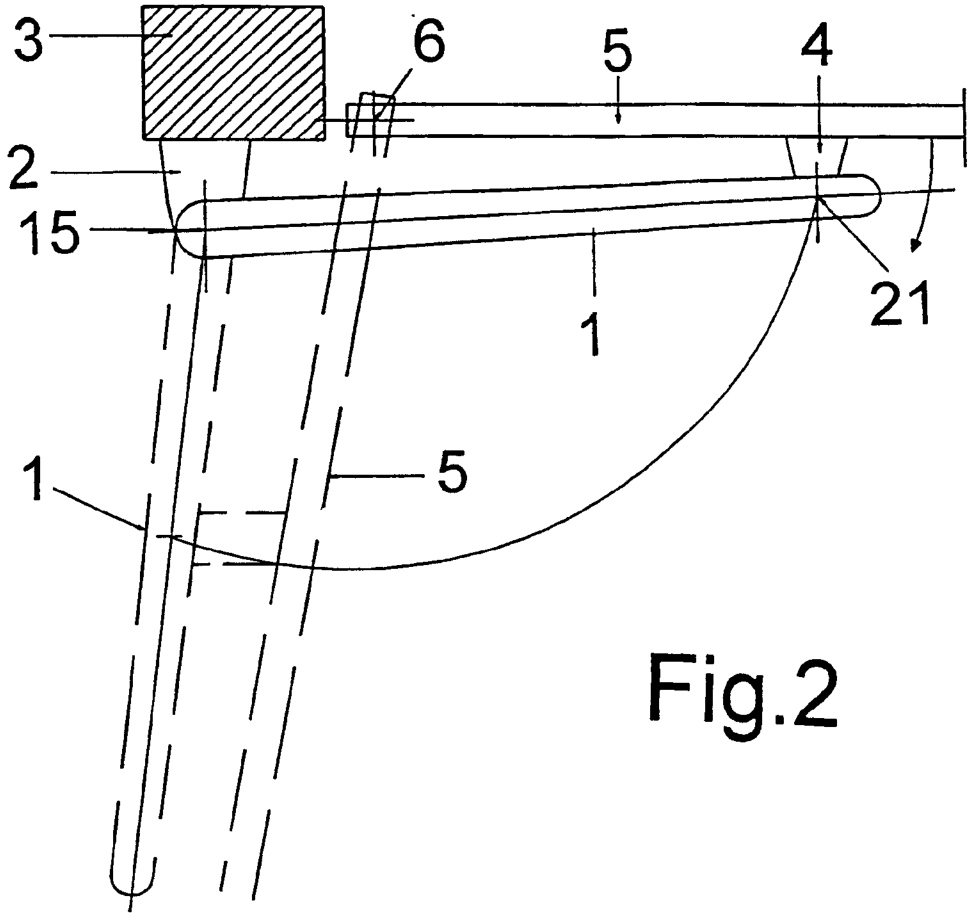
Figure 3:
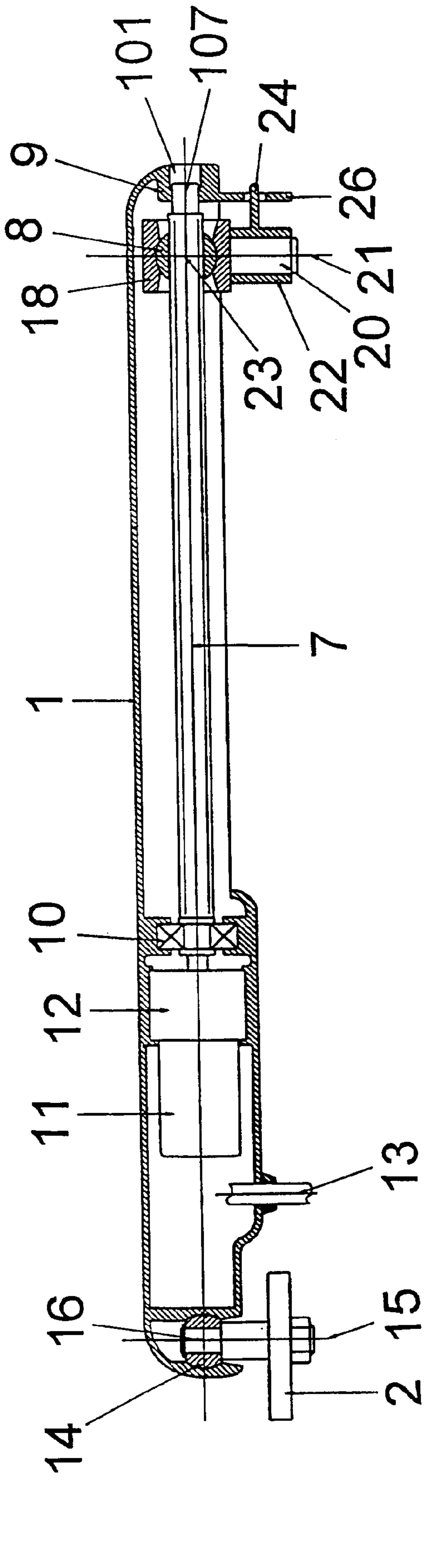
Figure 4:
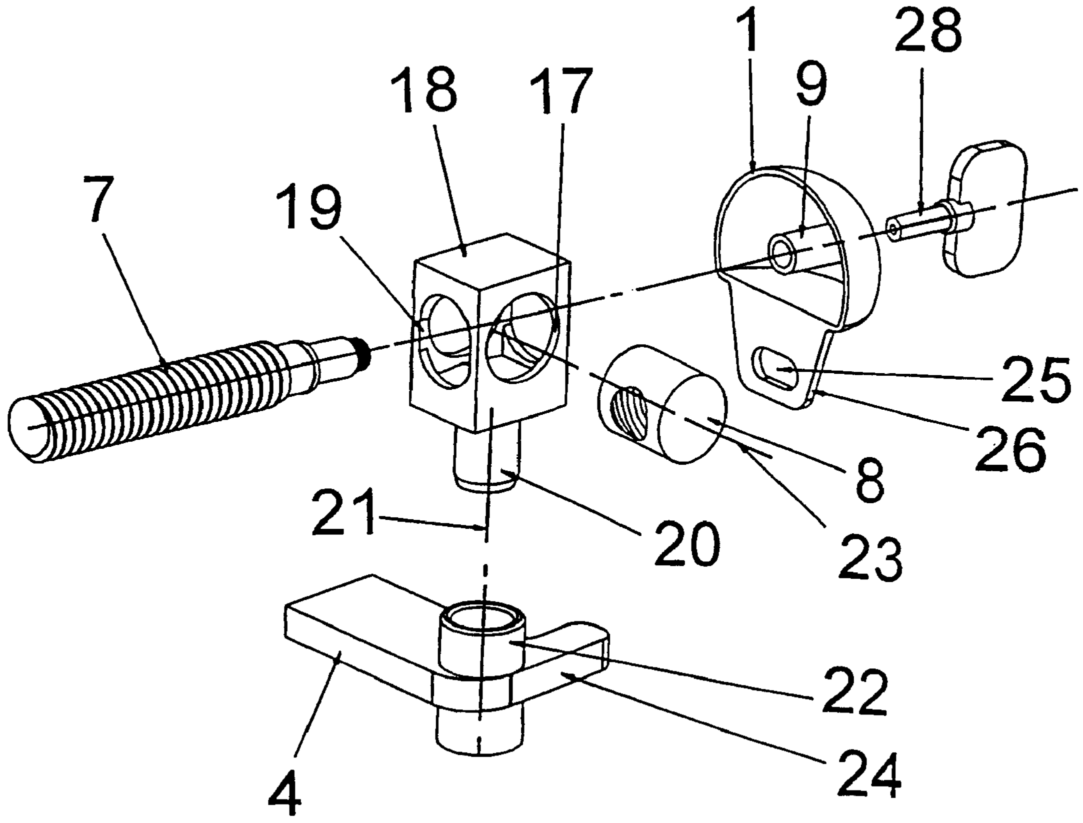
Figure 5:
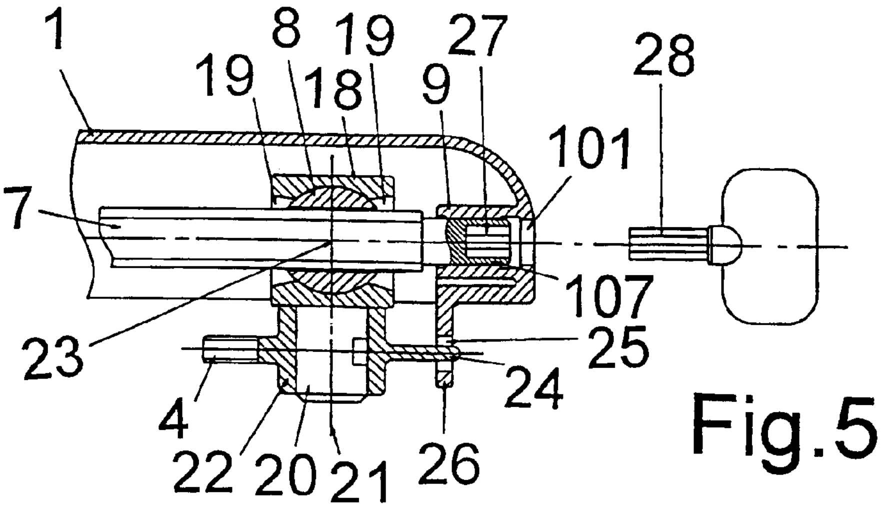
Figure 6:
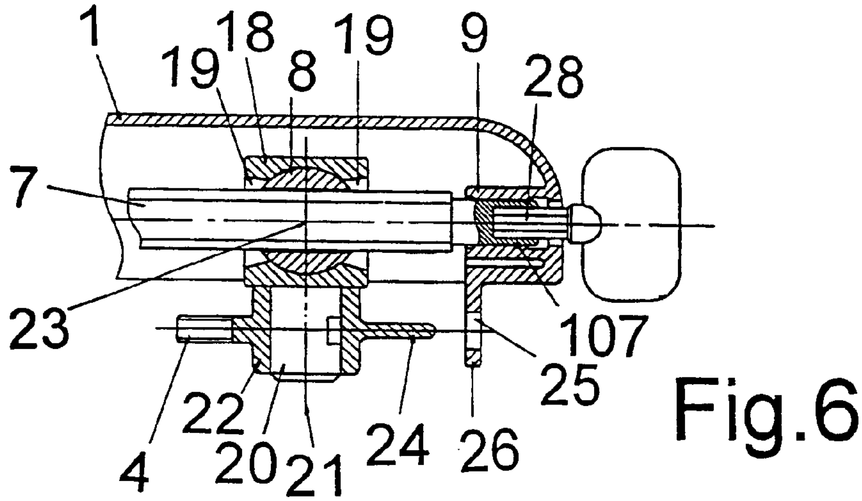
Figure 7:
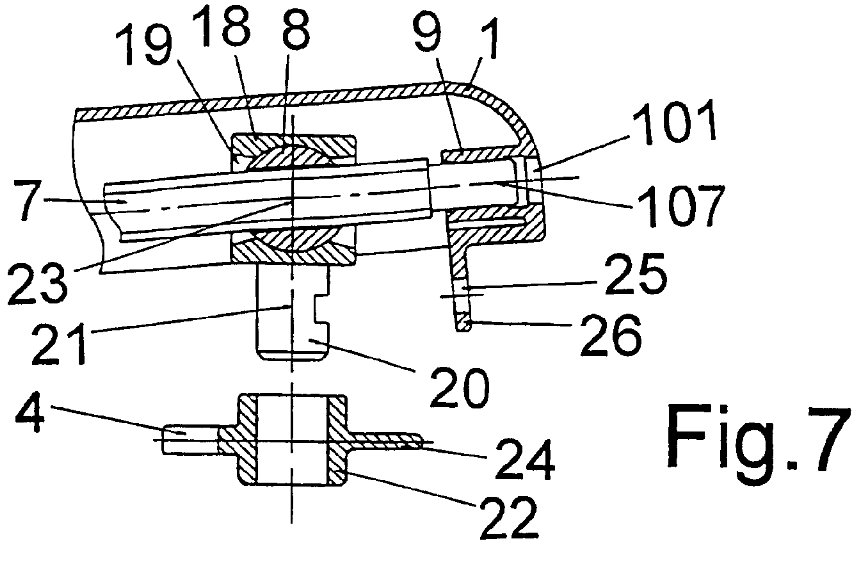

To better clarify the purposes and characteristics of the device in accordance with the present invention an exemplifying embodiment thereof is described below and illustrated in the annexed drawings wherein:

FIGS. 1 and 2 show a front elevation view and a plan view of a linear actuator in accordance with the present invention used for opening and closing the wing of a gate or main entrance, FIG. 3 shows a longitudinal cross section of the actuator arm, FIG. 4 shows an exploded perspective view of the joint between the actuator nutscrew and the gate wing, and FIGS. 5 to 7 show a vertical cross section of some phases of the manual emergency disengagement of the actuator arm of the gate wing.

The linear actuator consists of a virtually horizontal arm 1 articulated with its rear end to a supporting bracket 2 fastened for example to a pillar 3. The wing 5 of a gate is opened and closed by rotating around a virtually vertical oscillation axis 6. FIG. 2 shows the positions of the wing 5 and the actuator arm 1 with the gate closed in solid lines and the positions of the wing 5 and of the arm 1 with the gate open in broken lines.

In the actuator arm 1 is housed a pair of handling screws 7 and a nutscrew 8 of the irreversible type. The handling screw 7 extends in the longitudinal direction of the actuator arm 1 and is supported at its ends by two bearings 9 and 10. The screw 7 is operated by an electric motor 11 through a reduction gear 12 which are also housed in the actuator arm 1 and are coaxial mutually and with the screw 7. Reference number 13 designates the electric power supply cord to the motor 11.

The actuator arm 1 is articulated to the supporting bracket 2 by means of a ball joint 14 which allows the actuator arm 1 to make either a swinging movement in a virtually horizontal plane around a virtually vertical traversing axis 15, viz virtually parallel to the oscillation axis 6 of the wing 5 either an angular lifting and lowering movement around an inclination axis 16 virtually horizontal and transversal to the actuator arm 1.

In accordance with a variant embodiment not shown the ball joint 14 can be replaced with a universal joint with two axes at right angles to each other 15 and 16, viz with one joint made up of a cylindrical articulation with axis 15 and one cylindrical articulation with axis 16. The respective construction embodiment is clear to those skilled in the art.

The nutscrew 8 (so-called leadnut) is externally cylindrical and is housed in a turning manner in a corresponding cylindrical hole 17 provided in a leadnut holder 18 and is directed horizontally and transversely to the actuator arm 1. The leadnut holder 18 has a through hole 19 which is oriented in the longitudinal direction of the screw 7 and through which the screw 7 passes. This longitudinal hole 19 for passage of the screw 7 crosses the transversal hole 17 for housing the nutscrew 8 and is made with a diameter greater than that of the screw 7 or is flared at both ends so as to allow within certain limits a relative inclination between the screw 7 and the nutscrew 8 with respect to the leadnut holder 18 around the axis 23 of the transverse hole 17 of the leadnut holder 18 as shown in FIGS. 5 to 7 and for the purpose described below.

The leadnut holder 18 is integral with lower cylindrical articulation pivot 20 extending out of the actuator arm 1 through a lower longitudinal opening therein and is virtually vertical, viz its axis 21 is virtually parallel to the oscillation axis 6 of the wing 5 and with the traversing axis 15 of the actuator arm 1. This lower articulation pivot 20 of the leadnut holder 18 is inserted from above in a turning manner in a corresponding cylindrical articulation bush 22 integral with a bracket 4 fastened to the gate wing 5. The articulation pivot 20 can be easily withdrawn upward from the articulation bush 22.

This way the nutscrew 8 is articulated to the bracket 4 and hence to the wing 5 by means of a two-axis universal joint made up of two cylindrical articulations with axes at right angles to each other and of which one articulation is obtained with the housing of the cylindrical nutscrew 8 in the transverse hole 17 of the leadnut holder 18 in a manner turning around an axis 23 virtually horizontal and transversal to the actuator arm 1 (directional axis) while the other articulation is obtained with the housing of the lower articulation pivot 20 of the leadnut holder 18 in the articulation bush 22 of the bracket 4 fastened to the wing 5 in a manner turning around the virtually vertical axis 21 of said articulation pivot 20 and the corresponding articulation bush 22 (axis of articulation to the gate wing 5). By rotating the handling screw 7 by means of the motor 11 and the reduction gear 12 in one direction and the other the nutscrew 8 is made to run along the actuator arm 1 and entrains the gate wing 5 while causing it to oscillate from the closed position (shown in solid lines in FIG. 2) to the open position (shown in broken lines in FIG. 2) while the actuator arm 1 oscillates in a corresponding manner around its traversing axis 15.

The above described joint between the nutscrew 8 and the bracket 4 fastened to the wing is made in such a manner as to allow disengagement of the nutscrew 8 from the wing 5 merely by upwardly drawing the lower articulation pivot 20 of the leadnut holder 18 from the respective articulation bush 22 with a corresponding angular upward shift of the actuator arm 1 around its inclination axis 16 accompanied by a corresponding relative rotation between the leadnut holder 18 and the nutscrew 8 around the directional axis 23 as shown in FIG. 7.

This disengagement of the actuator arm 1 from the gate wing 5 can be readily performed manually in an emergency, for example power failure either in the open position of the wing 5 or in any intermediate position between the open and closed positions of the wing 5. In the closed position of the wing 5 on the other hand, viz in the respective forward end-of-travel position of the nutscrew 8 a stop projection 24 integral with the bracket 4 fastened to the wing 5 inserts itself automatically in the direction of movement of the nutscrew 8 in a corresponding opening or recess 25 provided in a stop fin 26 fastened to the free front end of the actuator arm 1 and extending downward therefrom as shown in FIGS. 3 and 5. In this engagement position of the stop projection 24 in the stop fin 26 the articulation pivot 20 certainly cannot be withdrawn upward from the articulation bush 22 integral with the bracket 4 since the actuator arm 1 is stopped vertically to the gate wing 5 by the mutually engaged stop projections 24, 25 and therefore cannot be raised angularly with respect to the articulation bush 22 around its inclination axis 16. The wing 5 can then be opened only by the electric motor 11 at least for an initial section sufficient for bringing about disengagement of the stop members 24, 25.

Nevertheless, in an emergency, for example a power failure, to allow manual opening of the gate wing 5 after disengagement of the actuator arm 1 from the gate wing 5 even in the closed position of the gate wing 5, viz in the position illustrated in FIG. 5, the end 107 of the screw 7 supported in the bearing 9 passes through said bearing and is accessible from the outside through a corresponding hole 101 in the free front end of the actuator arm 1. In said end 107 of the screw 7 is provided a coaxial head hole 27 with a cross section profile other than round and preferably provided with a coding and in which can be engaged axially from the outside through the hole 101 the tang correspondingly profiled and preferably coded of a release key 28 as illustrated in FIG. 6. By means of this release key 28 the screw 7 can be rotated manually so as to shift the nutscrew 8 together with the leadnut holder 18 from its closing end position of the gate wing 5 (position illustrated in FIG. 5 and in which the stop members 24, 25 are engaged together)

backwards toward the rear end of the actuator arm 1 at least to a position illustrated in FIG. 6 and in which the stop projection 24 integral with the bracket 4 is completely withdrawn from the opening 25 in the stop fin 26 integral with the actuator arm 1. In this position the actuator arm 1 is then released vertically from the gate wing 5 and can be shifted by hand angularly upward around its inclination axis 16 with simultaneous corresponding rotation of the nutscrew 8 in the leadnut holder 18 so as to extract the articulation pivot 20 of the leadnut holder 18 from the bush 22 fastened to the gate wing 5 as illustrated in FIG. 7 and described above. The gate wing 5 is thus completely disengaged from the actuator arm 1 and can be manually opened and even closed. Upon reclosing the gate wing 5 in a position a little before its complete closing the articulation pivot 20 of the leadnut holder is again engaged from above in the articulation bush 22 of the bracket 4 fastened to the gate wing 5 by means of a corresponding angular shift downward of the actuator arm 1 around its inclination axis 16 with simultaneous rotation of the nutscrew 8 in the leadnut holder 18 (return from the position shown in FIG. 7 to the position shown in FIG. 6) and then the nutscrew 8 is shifted forward together with the leadnut holder 18 by manual rotation of the screw 7 by means of the release key 28 until it again reaches the forward end of travel position of the nutscrew 8 as illustrated in FIG. 5 and in which the articulation bush 22 again engages in the opening 26 of the stop fin 26 thus again stopping the actuator arm 1 vertically to the gate wing 5 and preventing—after extraction of the key 28—manual opening of the gate wing 5. In this manner, even in an emergency, for example during a power failure, the gate wing 5 can be manually opened and closed only by authorized persons in possession of the respective key 28.

The above mentioned universal articulation joint with two axes 21 and 23 between the nutscrew 8 and the gate wing 5 can be replaced by a ball joint allowing the same movements as those described above in combination with the possibility of disengaging the nutscrew 8 from the gate wing 5 by an upward angular shifting of the actuator arm 1 around its inclination axis 16. The embodiment of a ball joint of this type is known to those skilled in the art. It is also clear that the articulation of the leadnut holder 18 to the bracket 4 fastened to the gate wing 5 can be provided by a construction method the reverse of that described, viz providing the articulation pivot 20 on the bracket 4 and the articulation bush 22 on the leadnut holder 18. Similarly the positions of the stop members 24, 25 can be inverted by providing the stop projection 24 on the actuator arm 1 and the corresponding stop opening or recess 25 in a part integral with the bracket 4 or the wing 5. In a similar manner the front end 107 of the screw 7 instead of having a profiled axial engagement hole 107 can have a profiled end engagement tang while the release key 28 can have a corresponding profiled engagement hole to be fitted on the profiled engagement tang of the end 107 of the screw 7.

What is claimed is:

1. A linear actuator for operation of gates, doors or barriers provided with at least one closing wing (5) swinging around a substantially vertical oscillation axis (6), the linear actuator comprising an articulated actuator arm (1) designed to be rotatably mounted onto a fixed support (2) to swing around a traversing axis (15) substantially parallel to the oscillation axis (6) of the wing (5) and near the oscillation axis (6), with the actuator arm (1) comprising an irreversible handling pair consisting of a screw (7) and a respective nutscrew (8) of which the screw (7) extends in the longitudinal direction of the actuator arm (1) and is operated at a rear end turned towards the actuator arm traversing axis (15) by an electric motor (11) and by a reduction gear (12) assembled in the actuator arm (1) while the nutscrew (8) slides along the actuator arm (1) and is designed to be rotatably connected to the wing (5) or to a part (4) fastened to the wing (5), so as to rotate around an articulation axis (21) substantially parallel to the oscillation axis (6) of the wing (5), wherein the actuator arm (1) comprises, at an end designed to be mounted onto the fixed support (2), a first joint (14) allowing, in addition to oscillation of the actuator arm (1) around the traversing axis (15), an angular rotation in a vertical plane of the actuator arm upward around an inclination axis (16) substantially horizontal and transversal to the actuator, and the rotatable connection between the nutscrew (8) and the wing (5) comprises a second joint allowing disengagement of the nutscrew from the wing by means of an upward angular shift of the actuator arm (1) around the inclination axis (16) thereof.

2. The actuator in accordance with claim 1, further comprising movable stop means (24) operated or borne by the nutscrew (8) or by parts (4 movable together with the nutscrew and integral with the wing (5) wherein said movable stop means (24) automatically engage, in a forward end position of the nutscrew (8) corresponding to the closed position of the wing (5), with associated stop means (25) borne by the actuator arm (1) so as to prevent upward angular rotation of the actuator arm (1) around the inclination axis (16), and a forward end (107) of the screw (7) opposite the operating motor (11) is accessible at the respective free end of the actuator arm (1) and can be coupled with manual rotation means (28) with the aid of which the screw (7) can be rotated in an emergency in such a manner as to shift the nutscrew (8) from a forward end position corresponding to the closed position of the wing backward towards its rear end and by an amount such as to disengage the movable stop means (24) from the stop means (25) borne by the actuator arm (1) and thus allow upward angular rotation of the actuator arm (1) around the inclination axis (16) so as to disengage the nutscrew (8) and hence the actuator arm (1) from the wing (5) and allow manual rotation thereof.

3. The actuator in accordance with claim 2, wherein the movable stop means (24) borne by the nutscrew (8) and the associated stop means (25) borne by actuator arm (1) are engageable and disengageable by the movement of the nutscrew (8) in the longitudinal direction of the actuator arm (1).

4. The actuator in accordance with claim 3, wherein said movable stop means (24) is at least one male or female stop engagement part (24) integral with the leadnut holder member (18) or with the wing (5) and said associated stop means (25) is an associated female or male stop engagement part (25) provided on the free forward end of the actuator arm (1).

5. The actuator in accordance with claim 2, wherein the manual rotation means consist of an axial hole (27) in a head (107) of the screw (7) and having a profile other than round corresponding to a certain coding, and a release key (28) with a tang having a correspondingly profiled cross section engageable in said hole (27) in the screw head (107).

6. The actuator in accordance with claim 2, wherein the manual rotation means consists of a tang on a head (107) of the screw (7) and having a profile other than round corresponding to a certain coding, and a release key (28) with an axial hole having a corresponding profiled cross section engageable on said tang of the screw head (107).

7. The actuator in accordance with claim 1, wherein the first joint (14) is a ball joint.

8. The actuator in accordance with claim 1, wherein the first joint (14) is a universal joint with two cylindrical articulations at a right angle to each other, with one having an axis (16) substantially horizontal and transversal to the actuator arm (1), corresponding to said inclination axis (16), and the other with substantially vertical axis (15), corresponding to said traversing axis (15).

9. The actuator in accordance with claim 1, wherein the second joint is a two-axis universal joint with two cylindrical articulations at right angles to each other, with one having a directional axis (23) substantially horizontal and transversal to the actuator arm (1) between the nutscrew (8) and a leadnut holder member (18) and the other with a substantially vertical axis (21), corresponding to said articulation axis (21), provided between the leadnut holder (18) and the wing (5).

10. The actuator in accordance with claim 9, wherein the two-axis universal joint consists of the leadnut holder member (18) provided below with a cylindrical articulation pivot (20) with axis (21) substantially parallel to the wing oscillation axis (6) with said articulation pivot (20) engaging in a manner turning around its axis (21) a corresponding articulation bush (22) integral with the wing (5) and withdrawable upward from said bush (22) while the nutscrew (8) is assembled in the leadnut holder (18) so as to turn around the directional axis (23) substantially horizontal and transversal to the actuator arm (1).

11. The actuator in accordance with claim 10, wherein the leadnut holder (18) is a body with two crossed holes (17, 19) one of which is a through hole (19) directed longitudinally to the actuator arm (1) and is designed for passage of the screw (7), while the other (17) is cylindrical and substantially horizontal and transversal to the actuator arm (1) and the externally cylindrical nutscrew (8) is housed therein in a turning manner.

12. The actuator in accordance with claim 11, wherein the longitudinal hole (19) of the leadnut holder (18) is flared at both ends or is made wide enough to allow relative angular movement between the screw (7) and the leadnut holder (18) upon angular rotation of the actuator arm (1) around its inclination axis (16).

13. The actuator in accordance with claim 10, wherein the leadnut holder member (18) is a one-piece body, with either the articulation pivot (20) or the articulation bush (22) integral therewith.

14. The actuator in accordance with claim 1, wherein the second joint is a ball joint.

* * * * *